(12) United States Patent
Kafai et al.

(10) Patent No.: US 11,599,561 B2
(45) Date of Patent: Mar. 7, 2023

(54) DATA STREAM ANALYTICS

(71) Applicant: Hewlett Packard Enterprise Development LP, Houston, TX (US)

(72) Inventors: Mehran Kafai, Palo Alto, CA (US); April Slayden Mitchell, Palo Alto, CA (US); Kave Eshghi, Palo Alto, CA (US); Omar Aguilar, Tlaquepaque (MX); Hongwei Shang, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 541 days.

(21) Appl. No.: 15/142,504

(22) Filed: Apr. 29, 2016

(65) Prior Publication Data

US 2017/0316081 A1 Nov. 2, 2017

(51) Int. Cl.
  *G06F 16/28* (2019.01)
  *G06F 16/22* (2019.01)
  *G06F 16/2455* (2019.01)

(52) U.S. Cl.
  CPC ........ *G06F 16/285* (2019.01); *G06F 16/2228* (2019.01); *G06F 16/24568* (2019.01); *G06F 16/289* (2019.01)

(58) Field of Classification Search
  CPC ............. G06F 17/30598; G06F 16/285; G06F 16/24568; G06F 16/289; G06F 16/2228
  See application file for complete search history.

(56) References Cited

U.S. PATENT DOCUMENTS

| 7,937,269 | B2 | 5/2011 | Aggarwal et al. |
| 8,429,216 | B2* | 4/2013 | Eshghi ................. G06F 17/10 382/209 |
| 8,606,774 | B1* | 12/2013 | Makadia ............... G06F 3/048 707/723 |
| 9,275,427 | B1* | 3/2016 | Sharifi ............ G06F 16/7847 |
| 9,613,127 | B1* | 4/2017 | Rus ................. G06F 17/30303 |

(Continued)

FOREIGN PATENT DOCUMENTS

CN 103455531 12/2013

OTHER PUBLICATIONS

Flexer & Schnitzer, Can Shared Nearest neighbors Reduce Hubness in High-Dimensional Spaces, 2013, IEEE (Year: 2013).*

(Continued)

*Primary Examiner* — Mark D Featherstone
*Assistant Examiner* — Tony Wu
(74) *Attorney, Agent, or Firm* — Sheppard Mullin Richter & Hampton LLP

(57) ABSTRACT

Examples disclosed herein involve data stream analytics. In examples herein, a data stream may be analyzed by computing a set of hashes of a real-valued vector, the real-valued vector corresponding to a sample data object of a data stream; generating a list of data objects from a database corresponding to the sample data object based on the set of hashes, the list of data objects ordered based on similarity of the data objects to the sample data object of the data stream; and updating a data structure representative of activity of the sample data object in the data stream based on the list of data objects, the data structure to provide incremental analysis corresponding to the sample data object.

18 Claims, 7 Drawing Sheets

(56) References Cited

U.S. PATENT DOCUMENTS

| | | | | |
|---|---|---|---|---|
| 10,929,464 | B1* | 2/2021 | Zuczek | G06F 16/432 |
| 2003/0208484 | A1* | 11/2003 | Chang | G06F 16/24542 |
| 2007/0043723 | A1* | 2/2007 | Bitan | G06F 16/951 |
| 2009/0112905 | A1* | 4/2009 | Mukerjee | G06F 17/30625 |
| 2012/0327956 | A1* | 12/2012 | Vasudevan | H04L 67/1097 |
| | | | | 370/477 |
| 2013/0080836 | A1* | 3/2013 | Stergiou | G06F 19/3418 |
| | | | | 714/37 |
| 2013/0187926 | A1* | 7/2013 | Silverstein | G06Q 10/105 |
| | | | | 345/440 |
| 2014/0067830 | A1* | 3/2014 | Buhler | G06F 19/22 |
| | | | | 707/749 |
| 2014/0108335 | A1* | 4/2014 | Chan | H04L 67/1097 |
| | | | | 707/610 |
| 2015/0169633 | A1* | 6/2015 | Yee | G06F 16/51 |
| | | | | 707/723 |
| 2015/0363644 | A1* | 12/2015 | Wnuk | G06K 9/6215 |
| | | | | 382/103 |
| 2017/0004413 | A1* | 1/2017 | Flores | G06N 99/005 |
| 2017/0154282 | A1* | 6/2017 | Rossi | G06N 99/005 |

OTHER PUBLICATIONS

Ahmed, I. et al.; "Scaling Up for High Dimensional and High Speed Data Streams: Hsdstream"; Oct. 12, 2015; 12 pages.
Amini, A. et al.; "A Fast Density-based Clustering Algorithm for Real-time Internet of Things Stream"; Jun. 19, 2014; 12 pages.
Ding, R. et al.; "YADING: Fast Clustering of Large-scale Time Series Data"; Nov. 27, 2014; 12 pages.

* cited by examiner

DATA STREAM ANALYTICS

BACKGROUND

Data streams involve sequences of data (e.g., packets of data or data packets) used to transmit or receive information that is in the process of being transmitted. Data streams are received from streaming sources, which may be continuously transmitting the data streams. Examples of streaming sources include Internet of Things (IoT) devices, log files, information technology (IT) devices, mobile devices, social media websites, cameras, etc.

BRIEF DESCRIPTION OF THE DRAWINGS

Wherever possible, the same reference numbers will be used throughout the drawing(s) and accompanying written description to refer to the same or like parts.

DETAILED DESCRIPTION

Examples disclosed herein involve data stream analytics. In examples herein, a dynamic pipeline is used to analyze data streams from a plurality of streaming devices. Examples herein involve a data stream manager that generates hashes of received data objects (e.g., based on real-valued vectors of the data objects), indexes the hashes, generates a list of similar data objects based on the received data objects, and updates data structures for the data objects based on the list of similar data objects and each newly received data object. Accordingly, each time a new data object of a data stream is received, analytics associated with the data object can be updated and analyzed in real-time.

Big data analytics involves the analysis of massive amounts of data. Accordingly, analytics of big data is commonly performed in batches. However, oftentimes, incoming data for a big data analysis system arrives from streaming devices, not in batches. As such, the streaming data causes or provides constant or nearly constant updating to the set of big data. Accordingly, examples herein enable real-time analytics, learning, and updates to data structures corresponding to data objects of data streams. Examples herein analyze received data streams in real-time by comparing data objects to previously received data objects of the streams, updating data structures corresponding to the respective data objects, and providing real-time analytics of the data objects. In examples herein, machine learning may be provided to the data structures to further determine parameter models and further update the data structures to create a dynamic pipeline for data stream analytics.

An example method includes computing a set of hashes of a real-valued vector, the real-valued vector corresponding to a sample data object of a data stream; generating a list of data objects from a database corresponding to the sample data object based on the set of hashes, the list of data objects ordered based on similarity of the data objects to the sample data object of the data stream; and updating a data structure representative of activity of the sample data object in the data stream based on the list of data objects, the data structure to provide incremental analysis corresponding to the sample data object.

As used herein, an object or data object refers to any object of a data stream that may be individually identifiable or representative of an item of the data stream. For example, a data object may include an image (or frame) of a video stream, a measurement from a sensor device, a click from a click activity stream, a sample of an audio stream, etc.

Figure 1:
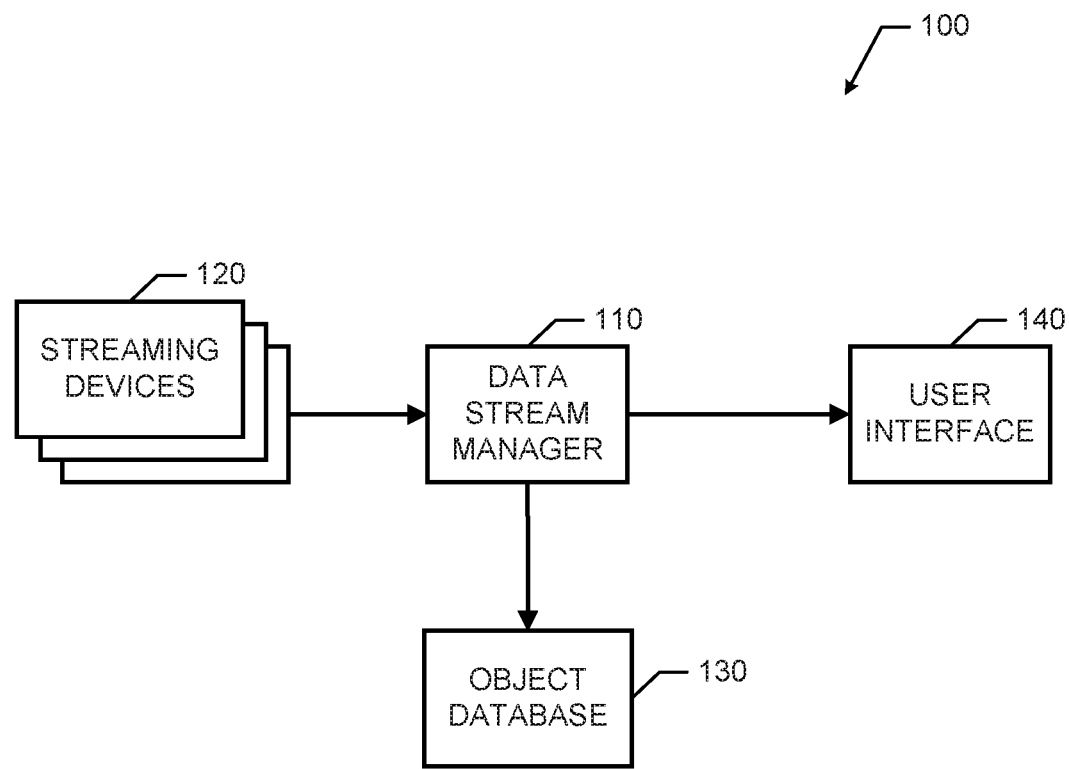
FIG. 1 is a schematic diagram of an example data stream analytics system including a data stream manager implemented in accordance with an aspect of this disclosure.

FIG. 1 is a schematic diagram of an example stream analytics system 100 including an example data stream manager implemented in accordance with the teachings of this disclosure. The example stream analytics system 100 includes the data stream manager 110, streaming devices 120, an object database 130, and a user interface 140. In the illustrated example of FIG. 1, the data stream manager 110 receives data streams from the streaming devices 120 and updates, in real-time, a data structure representative of data objects of the data streams and/or learns information corresponding to the data objects from the updated data structure using information from the object database 130 that may include previously received data associated with the data objects. The data stream manager 110 may then provide the updated data structures to the user interface 140, which may present or display representations of the data structures. Accordingly, in examples herein, the data stream manager 110 may provide real-time stream analytics from a plurality of streaming devices (e.g., thousands, millions, etc.) to identify data objects, update data structures associated with the data objects, and learn data object information of the data objects from the data streams (e.g., via clustering, hubness analysis, classification, reidentification, and nearest neighbor graph construction).

The example streaming devices 120 may be any type of streaming device or any combination of streaming devices, such as cameras, Internet of Things (IoT) devices, log files, information technology (IT) devices, mobile devices, social media websites, etc. Accordingly, the streaming data of the data streams may include image/video data, click activity, sensor data/measurements, network activity/performance, etc. There may be any number of streaming devices 120 in the stream analytics system 100. For example, the data stream manager 110 may receive thousands or millions of data streams from the streaming devices 120. Accordingly, in examples herein, the data stream manager 110 is to perform real-time stream analytics on many data streams, which may be of various types of data streams from various types of streaming devices 120. A single streaming device may be referred to herein as a streaming device 120 or one of the streaming devices 120.

In some examples, the streaming devices 120 may pre-process streamed data and provide the streamed data as real-valued vectors. For example, if a streaming device 120 is a camera, the streaming device 120 may convert a frame of the image stream to a real-valued vector. Accordingly, in such an example, for a camera that captures 30 frames per second (fps), the camera may provide 30 corresponding real-valued vectors per second to the data stream manager 110 for analysis.

The example object database 130 stores data object information received by the data stream manager 110. For example, the object database 130 may store an object identifier and hashes of real-valued vectors representative of data objects of the data stream. In examples herein, the example object identifiers may be provided as prefixes of the data stream objects (or real-valued vectors) and the corresponding hashes are calculated by the data stream manager 110. The object identifiers and the hashes may be indexed and stored in an index (e.g., a lookup table, a key-value store, an inverted index, etc.) of the object database 130 by the data stream manager 110. Considering the large amount of data received from multiple streams, the object database 130 and/or index of the object database 130 may be implemented by a large pool of shared memory, such as a persistent, byte-addressable memory accessible via a memory fabric.

The example user interface 140 may be implemented by any input device(s) and/or output device(s) to facilitate user interaction with the data stream manager 110. The user interface 140 may include a graphical user interface (GUI) to provide a visual presentation of a data structures representative of the stream analytics herein. Accordingly, a user may select, manage, update, view, and analyze data streams or objects of data streams in real-time in accordance with the examples herein. Furthermore, a user may adjust settings of the data stream manager 110 (e.g., for methods used in identifying data objects corresponding to an instant object).

The example data stream manager 110 receives data streams, indexes the data streams in the object database, and updates data structures or a data structure representative of data objects and/or the data streams. Furthermore, in examples herein, the data stream manager 110 may learn information from the data streams and update the data structure accordingly. For example, referring to the video stream example, the data stream manager may analyze and/or gain information on an individual captured at various times/locations by a plurality of different cameras streaming data to the data stream manager 110. In such an example, the data stream manager 110 may update a data structure to indicate where the person was at which times, characteristics learned of the user (e.g., male or female, height, etc.), who was with the individual at which times, whether the individual was carrying an object or not, interests of the individual, etc. An example implementation of the data stream manager 110 of FIG. 1 is further discussed in connection with FIG. 2.

Figure 2:
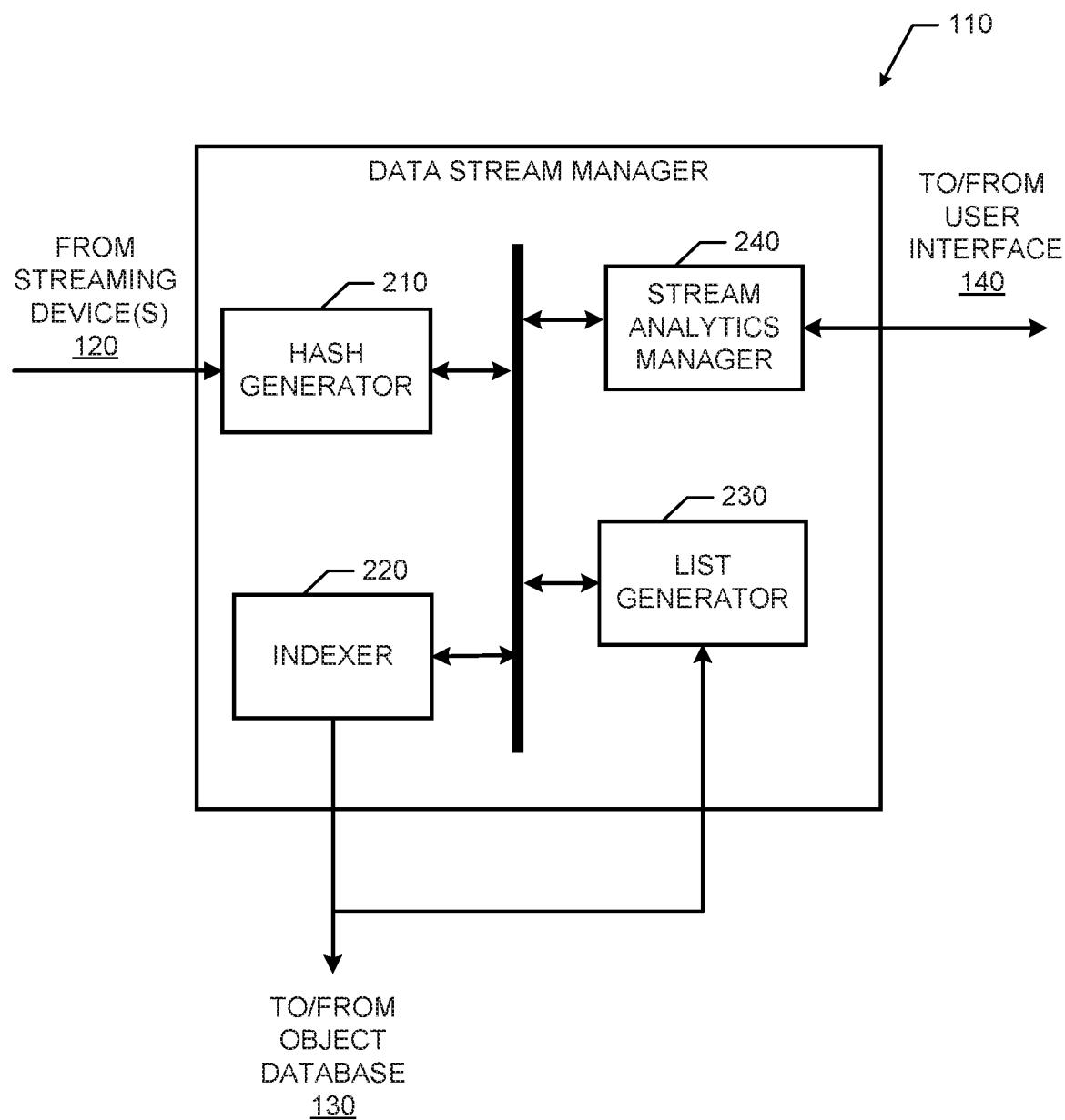
FIG. 2 is a block diagram of an example data stream manager that may be used to implement the data stream manager of FIG. 1 in accordance with an aspect of this disclosure.

FIG. 2 is a block diagram of an example data stream manager 110 constructed in accordance with examples herein. The example data stream manager 110 of FIG. 2 includes a hash generator 210, an indexer 220, a list generator 230, and a stream analytics manager 240. In examples herein, for each object (or real-valued vector) of a data stream received by the data stream manager 110, the hash generator 210 calculates a hash for the object, the indexer 220 indexes the hash for the object and an object identifier, the list generator 230 generates a list of objects in the index based on the calculated hash, and the stream analytics manager 240 updates a data structure associated with the received object and/or learns information corresponding to the object.

The example hash generator 210 generates a set of hashes for received data objects or real-valued vectors corresponding to the data objects (e.g., real-valued vectors calculated/processed from the data objects by the streaming devices 120). The set of hashes may be computed using an orthogonal transform based indexing of the real-valued vector. For example, the hash generator 210 may use a Walsh-Hadamard transform of the real-valued vector to create multiple keys for a received vector. In examples herein, the hash generator 210 may use partitioning (rather than sorting) to identify or select a top set of keys to be included as the hashes in an index (e.g., a look-up table, a key-value store, an inverted index, etc.). The example indexer 220 indexes the hashes for real-valued vector and an object identifier (e.g., identifying the object, a stream of the object, etc.) of the received real-valued vector in an index of the object database 130. Accordingly, multiple hashes for each received real-valued vector corresponding to a data object may be stored in the object database 130. As such, an index of previously received data objects is built for analysis for subsequently received data objects in accordance with examples herein.

In some examples, the hash generator 210 (or another component of the data stream manager 110) may calculate a real-valued vector of a data object when a streaming device 120 that sent the data object does not provide or calculate the real-valued vector for the data object. The example hash generator 210 may calculate the real-valued vector based on an application of the data object or type streaming device that provide the data object. Accordingly, real-valued vectors for data objects may be preprocessed prior to calculating the hashes by the streaming device or the data stream manager 110.

The example list generator 230, for each received real-valued vector corresponding to a data object of a data stream, generates a list of most similar data objects previously received. For example, the list generator 230 performs a nearest neighbor search using calculated hashes for a received real-valued vector corresponding to an instant data object in the index of the object database 130 and returns a list of the most similar objects (or object identifiers) found in the index. In examples herein, for each real-valued vector of a data object, the list generator 230 may identify objects in the index that share the most number of keys or hashes generated by the hash generator 210. Accordingly, the list generator 230 may identify the most amount of overlap among hashes/keys generated for previously received data objects and the instant data object for which the list is being generated.

The example stream analytics manager 240 of FIG. 2 updates a data structure based on the received data object (or real-valued vector of the data object). Based on the data structure, the stream analytics manager 240 performs learning tasks on the data stream and/or data object. For example, the stream analytics manager 240 may perform incremental clustering, hubness analysis, classification, reidentification, nearest neighbor graph construction, etc.

Figure 3:
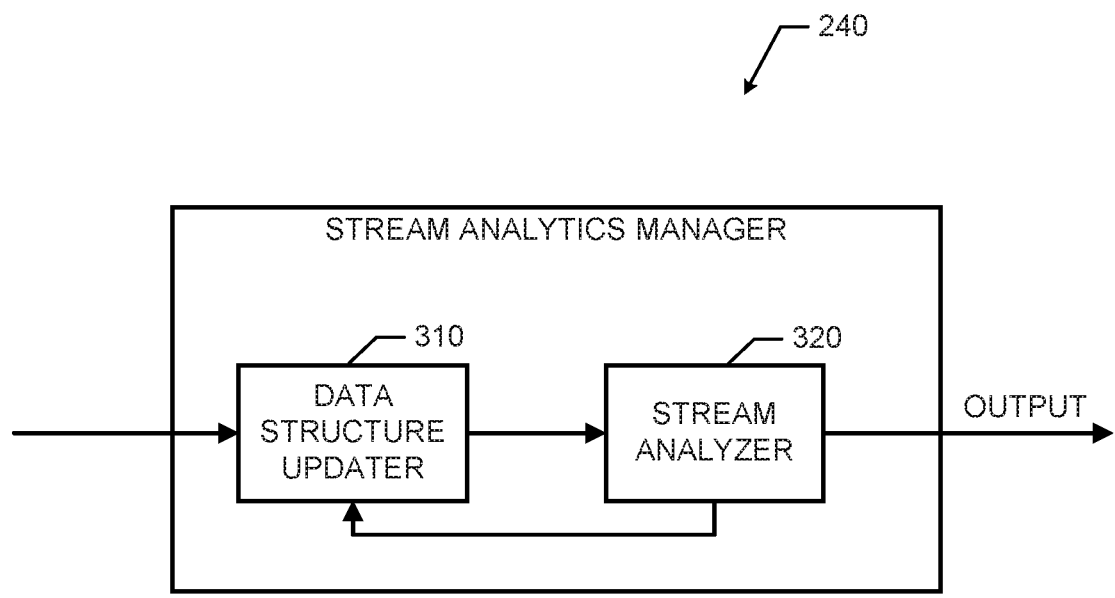
FIG. 3 is a block diagram of an example stream analytics manager that may be implemented by the data stream manager of FIG. 2 in accordance with an aspect of this disclosure.

FIG. 3 is a block diagram of an example implementation of a stream analytics manager 240 that may be used to implement the stream analytics manager 240 of FIG. 2. The example stream analytics manager 240 of FIG. 3 includes a data structure updater 310 and a stream analyzer 320. In examples herein, the data structure updater 310 updates data structures used by the stream analyzer 320 to perform stream analytics on data streams from the streaming devices 120. For example, the data structure updater 310 may update a graph, a list, or any other type of structure used to analyze the data streams received from the streaming devices 120 in real-time. In examples herein, the data structure updater 310 may update a graph of the data objects of a data stream (e.g., to indicate the nearest neighbors of received data objects (e.g., the most similar data objects)), a classification list indicating class label of the data objects, a cluster center list indicating data objects clusters and characteristics of the clusters (e.g., centers and edges of the clusters), a hubness data structure indicating hub data objects for hubness reduction, an identification analysis for identifying individuals across multiple data objects (e.g., frames of video) from multiple streaming devices 120, etc.

The example stream analyzer 320 may analyze corresponding data structure to output results (e.g., to the user interface 140). For example, using the video stream example, the stream analyzer 320 may identify each and every individual in view of a camera at a given moment, classify individuals into a subclass (e.g., male or female), identify a number of unique individuals (e.g., clustering or person count), reidentification by matching individuals recognized from different cameras and/or at different times/locations, and hubness analysis to identify hub data objects and perform hubness reduction for the video stream. In examples herein, the stream analyzer 320 may apply machine learning to the updated data structure based on the updates to the data structure. Accordingly, such machine learning may enable the stream analyzer 320 to identify characteristics of the data objects in the data streams (e.g., classifications), make predictions in the data streams (e.g., where an individual is expected to be identified next, what an individual is interested in, etc.). Furthermore, the stream analyzer 320 may identify model parameters for use in other applications or by other data stream managers similar to the data stream manager 110. In the illustrated example of FIG. 3, the stream analyzer 320 may feedback learned information or results of an analysis to the data structure updater 310 for further updates to the data structure. For example, based on feedback from the stream analyzer 320, the data structure updater 310 may add a new node and corresponding edges to a nearest neighbor graph, add new members to a cluster list, include the classification results in the classification data structure, etc.

While an example manner of implementing the data stream manager 110 of FIG. 1 is illustrated in FIGS. 2 and 3, at least one of the elements, processes and/or devices illustrated in FIGS. 2 and 3 may be combined, divided, re-arranged, omitted, eliminated and/or implemented in any other way. Further, the hash generator 210, the indexer 220, list generator 230, the stream analytics manager 240 (including the data structure updater 310 and the stream analyzer 320) and/or, more generally, the example data stream manager 110 of FIG. 2 may be implemented by hardware and/or any combination of hardware and executable instructions (e.g., software and/or firmware). Thus, for example, any of hash generator 210, the indexer 220, list generator 230, the stream analytics manager 240 (including the data structure updater 310 and the stream analyzer 320) and/or, more generally, the example data stream manager 110 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the hash generator 210, the indexer 220, list generator 230, the stream analytics manager 240 (including the data structure updater 310 and the stream analyzer 320) is/are hereby expressly defined to include a tangible machine readable storage device or storage disk such as a memory, a digital versatile disk (DVD), a compact disk (CD), a Blu-ray disk, etc. storing the executable instructions. Further still, the example data stream manager 110 of FIG. 2 may include at least one element, process, and/or device in addition to, or instead of, those illustrated in FIG. 2, and/or may include more than one of any or all of the illustrated elements, processes and devices.

Figure 4:
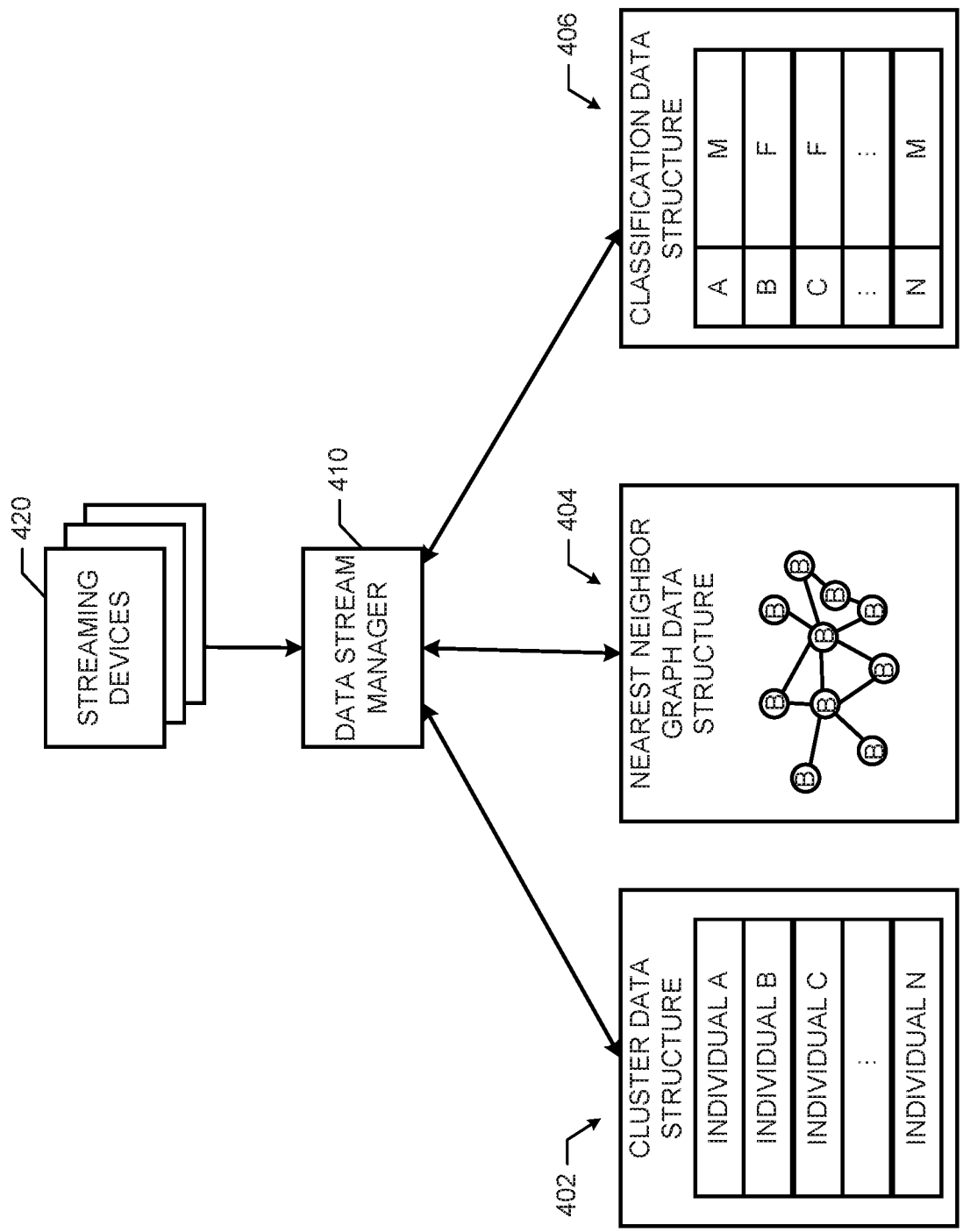
FIG. 4 illustrates example data structures that may be generated by the data stream manager of FIG. 2 in accordance with an aspect of this disclosure.

FIG. 4 illustrates example data structures 402, 404, 406 that may be generated and analyzed by a data stream manager 410 from data streams of streaming devices 420. The example data stream manager 410 of FIG. 4 maybe implemented by the data stream manager 110 of FIGS. 1 and/or 2 and the streaming devices 420 may be implemented by the streaming devices 120 of FIG. 1. In the illustrated example of FIG. 4, the data stream manager 410 generates and updates the data structures 402, 404, 406 each time a data object (or real-valued vector corresponding to a data object) of the data streams are received.

The example cluster data structure 402 of FIG. 4 is a cluster list. The example duster data structure 402 of FIG. 4 may be used to identify a number of unique individuals N in a video stream. Accordingly, the cluster data structure 402 may be used as a people counter and/or person identifier. Accordingly, when a new person is identified in a data object (e.g., a frame) of a data stream, which may be determined based on the list generator 230 providing a list indicating that no similar data objects exist in the index of the object database 130 (i.e., no data object including an image of that person had been received), then the clustering data structure may be updated to include the new individual.

The example nearest neighbor graph data structure 404 may be generated for each detected individual in a video stream. For example, each circle in the nearest neighbor graph may represent a data object that included an image of the person. The persons location in the nearest neighbor data structure 404 may be based on time that individual was seen, where that individual was seen, how clear of an image of the person is in the data object, etc. Accordingly, when a data object including an individual is received in a data stream, the data stream manager 410 may update the nearest neighbor graph data structure for that individual to updates characteristics or information for that person using a nearest neighbor graph.

The example classification data structure 406 may be used for classification of individuals identified in a video stream. In the example of FIG. 4, the data stream manager 410 may be used to classify individuals as known or unknown. The example classification may be made based on appearance of an individual, interests of the individual (e.g., where the individual was seen, if the individual is with anybody, etc.) belongings of the individual, etc. Accordingly, when a person is identified in a data object of a data stream, a determination as to a classification of the person may be made based on the list of data objects received from the list generator 230. Accordingly, a profile of an individual may be formulated from the data objects including or identifying the individual and the data stream manager 110 may continuously learn and update information corresponding with that person based on the received objects of the streams.

Although the examples of FIG. 4 refer to an example of using a images of a video stream, the same structures and/or other structures may be used for other types of streaming data (such as IoT data, click stream data, network performance data, etc.).

Figure 5:
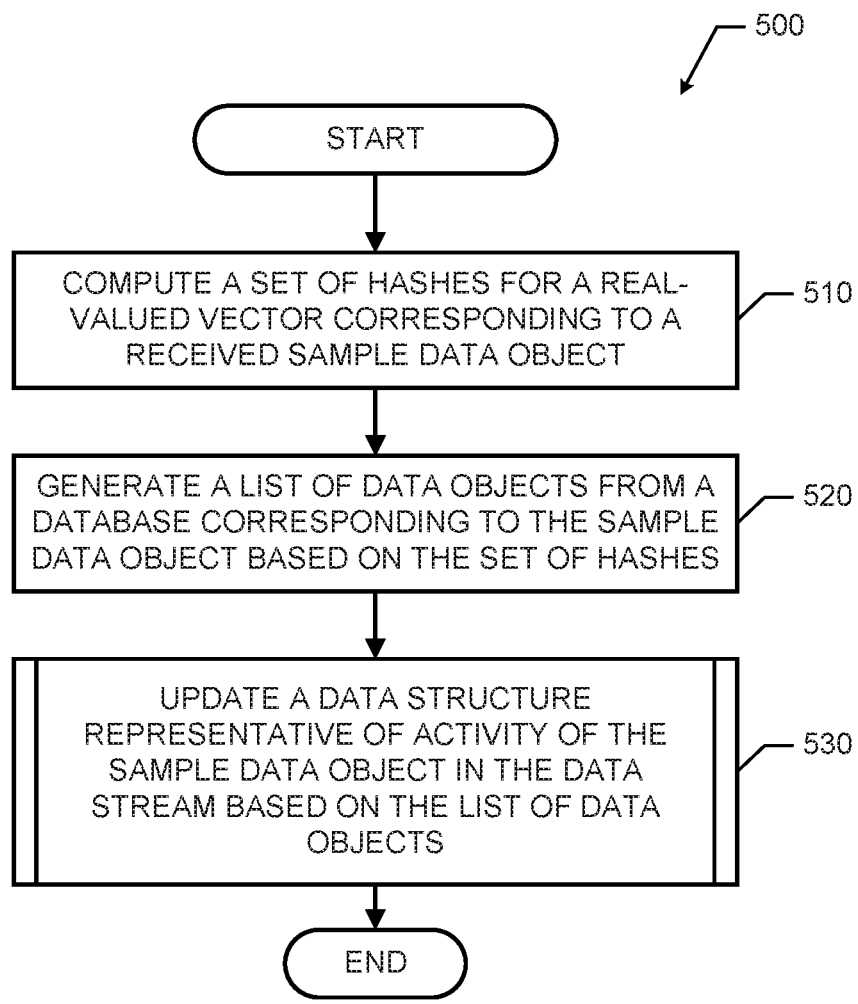
FIG. 5 is a flowchart representative of example machine readable instructions that may be executed to implement the data stream manager of FIG. 2.

A flowchart representative of example machine readable instructions for implementing the data stream manager 110 of FIG. 2 is shown in FIG. 5. In this example, the machine readable instructions comprise a program/process for execution by a processor such as the processor 712 shown in the example processor platform 700 discussed below in connection with FIG. 7. The program/process may be embodied in executable instructions (e.g., software) stored on a tangible machine readable storage medium such as a CD-ROM, a floppy disk, a hard drive, a digital versatile disk (DVD), a Blu-ray disk, or a memory associated with the processor 712, but the entire program/process and/or parts thereof could alternatively be executed by a device other than the processor 712 and/or embodied in firmware or dedicated hardware. Further, although the example program is described with reference to the flowchart illustrated in FIG. 5, many other methods of implementing the example the data stream manager 110 may alternatively be used. For example, the order of execution of the blocks may be changed, and/or some of the blocks described may be changed, eliminated, or combined.

The process 500 of FIG. 5 begins with an initiation of the data stream manager 110 (e.g., upon startup, upon instructions from a user, upon startup of a device implementing the data stream manager 110 (e.g., the stream analytics system 100), etc.). The example process 500 may be iteratively executed to dynamically analyze data streams in real-time. At block 510, the hash generator 210 computes a set of hashes for a real-valued vector corresponding to a received sample data object. For example, at block 510 the hash generator 210 may identify a top partition of computed hashes (e.g., a top 10 computed hashes) and provide the hashes to the indexer 220 for indexing in the object database 130 with object identifiers for the received sample data object.

At block 520, the list generator 230 generates a list of data objects from a database corresponding to the sample data object based on the set of hashes. For example, the list of data objects may be ordered based on similarity of the data objects in the object database 130 to the sample data objects of the data stream using the generated hashes as indices. At block 530, the stream analytics manager 240 updates a data structure representative of activity of the sample data object in the data stream based on the list of data objects. For example, at block 530, the stream analytics manager 240 may update a graph for the sample data object, a classification of the sample data object, a cluster list of a stream of the sample data object, etc. After block 530, the example process 500 ends. However, the example process 500 may be iteratively executed such that after many iterations of the example process 500, the data stream manager 110 may build a dynamically updated index of data stream objects that allows for updates to data structures for the data stream objects and corresponding machine learning associated with identified data objects and updates.

Figure 6:
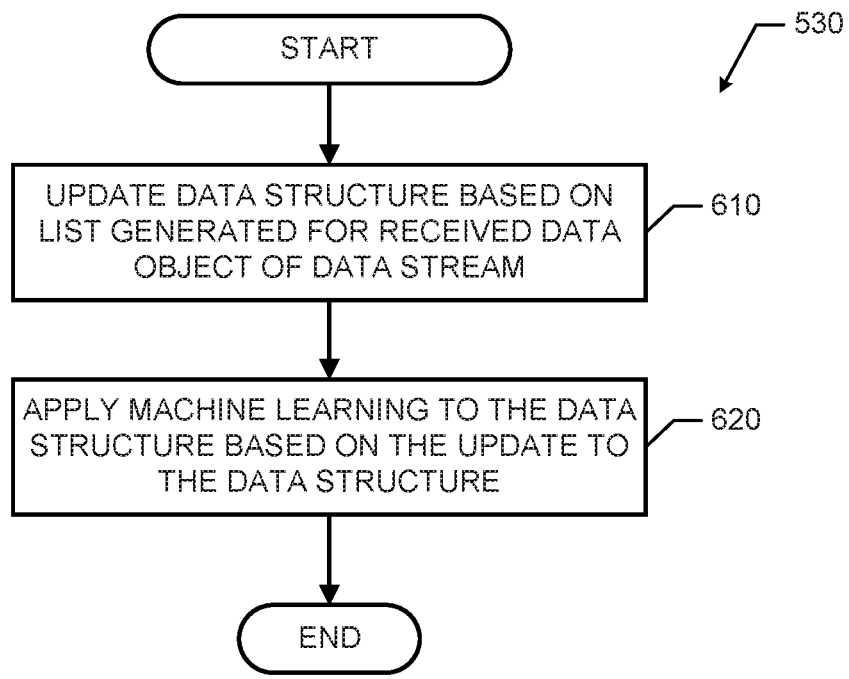
FIG. 6 is a flowchart representative of an example portion of the example machine readable instructions of FIG. 5 to implement the data stream manager of FIG. 2.

A flowchart representative of example machine readable instructions for implementing the stream analytics manager 240 of FIG. 3 is shown in FIG. 6. In this example, the machine readable instructions comprise a program/process for execution by a processor such as the processor 712 shown in the example processor platform 700 discussed below in connection with FIG. 7. The program/process may be embodied in executable instructions (e.g., software) stored on a tangible machine readable storage medium such as a CD-ROM, a floppy disk, a hard drive, a digital versatile disk (DVD), a Blu-ray disk, or a memory associated with the processor 712, but the entire program/process and/or parts thereof could alternatively be executed by a device other than the processor 712 and/or embodied in firmware or dedicated hardware. Further, although the example program is described with reference to the flowchart illustrated in FIG. F, many other methods of implementing the example A1 may alternatively be used. For example, the order of execution of the blocks may be changed, and/or some of the blocks described may be changed, eliminated, or combined.

The example process 600 of FIG. 6 begins with an initiation of the stream analytics manager 240 and/or the data stream manager 110. The example process 600 of FIG. 6 may be executed to update a data structure based on newly received data object and its relation to previously received data objects as well as application of machine learning corresponding to the received data objects of the data stream.

At block 610, the data structure updater 310 updates a data structure based on a list generated for received data object of a data stream. The example data structure update may be application specific and/or based on an analysis to be made on the data object and/or data stream. The example data structure may have been previously created based on previously received data objects. In some examples, the data structure of block 610 is newly created (rather than updated) as no other data object exists in the object database 130 that corresponds to a newly received data object. At block 620, the stream analyzer 320 applies machine learning to the updated data structure based on the update to the data structure. For example, at block 620, the stream analyzer 320 may identify the differences or changes to the data structure for the data object or data stream and develop or learn parameter models for analyzing the data object or data stream. After block 620, the example process ends.

As mentioned above, the example processes of FIGS. 5 and/or 6 may be implemented using coded instructions (e.g., computer and/or machine readable instructions) stored on a tangible machine readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible machine readable storage medium is expressly defined to include any type of machine readable storage device and/or storage disk and to exclude propagating signals and to exclude transmission media. As used herein, "computer readable storage medium" and "machine readable storage medium" are used interchangeably. Additionally or alternatively, the example processes of FIGS. 5 and/or 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory machine readable medium is expressly defined to include any type of machine readable storage device and/or storage disk and to exclude propagating signals and to exclude transmission media.

As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 7:
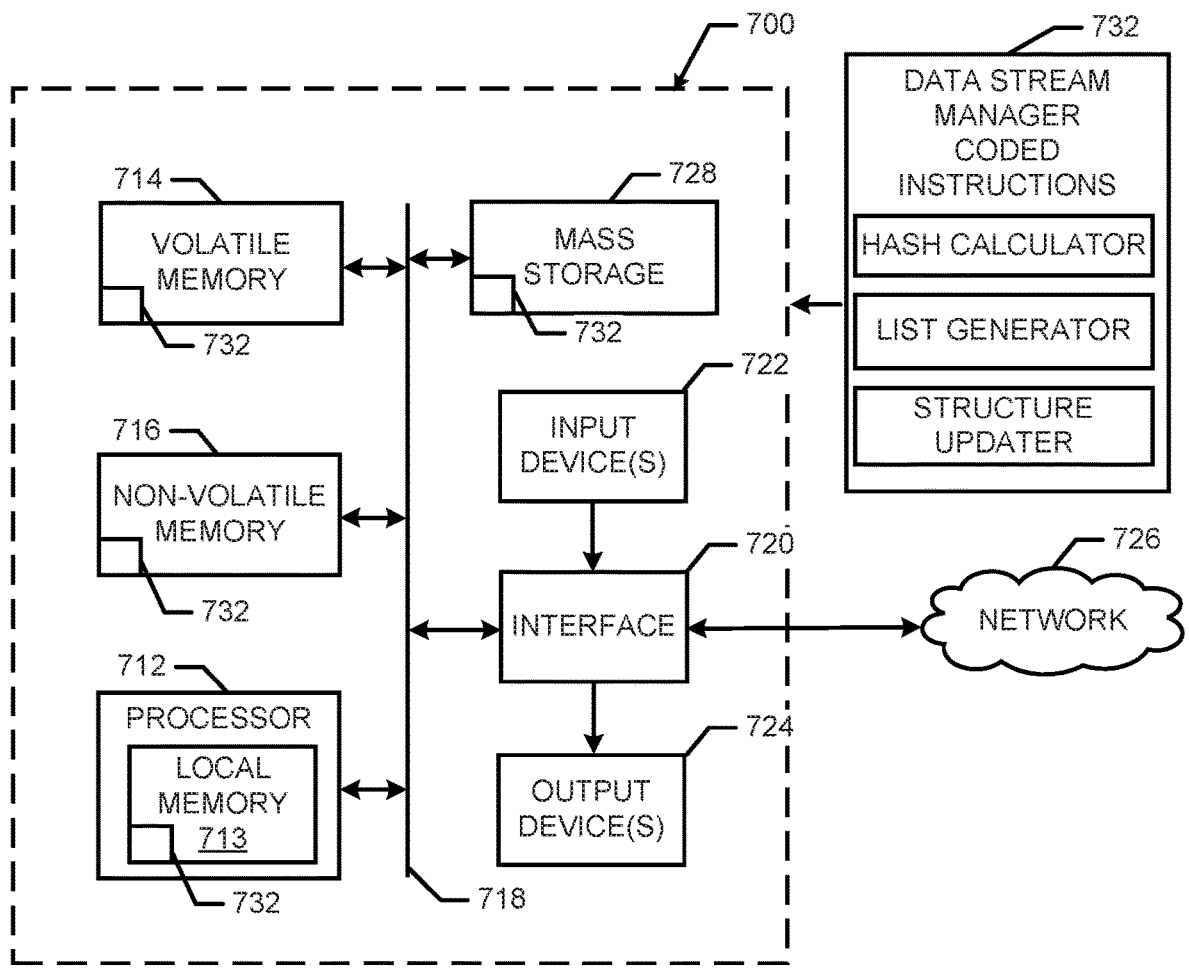
FIG. 7 is a block diagram of an example processor platform capable of executing the instructions of FIGS. 5 and/or 6 to implement the data stream manager of FIG. 2.

FIG. 7 is a block diagram of an example processor platform 700 capable of executing the instructions of FIGS. 5 and/or 6 to implement the data stream manager 110 of FIG. 2. The example processor platform 700 may be or may be included in any type of apparatus, such as a server, a personal computer, a mobile device, or any other type of computing device.

The processor platform 700 of the illustrated example of FIG. 7 includes a processor 712. The processor 712 of the illustrated example is hardware. For example, the processor 712 can be implemented by at least one integrated circuit, logic circuit, microprocessor or controller from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a peripheral component interconnect (PCI) express interface.

In the illustrated example, at least one input device 722 is connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

At least one output device 724 is also connected to the interface circuit 720 of the illustrated example. The output device(s) 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, may include a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes at least one mass storage device 728 for storing executable instructions (e.g., software) and/or data. Examples of such mass storage device(s) 728 include floppy disk drives, hard drive disks, compact disk drives, Blu-ray disk drives, RAID systems, and digital versatile disk (DVD) drives.

The coded instructions 732 of FIGS. 5 and/or 6 may be stored in the mass storage device 728, in the local memory 713 in the volatile memory 714, in the non-volatile memory 716, and/or on a removable tangible machine readable storage medium such as a CD or DVD.

From the foregoing, it may be appreciated that the above disclosed methods, apparatus and articles of manufacture provide dynamic analysis of data streams in real-time. Examples disclosed herein enable continuous analysis and updates to the analysis that provide machine learning capabilities for received data objects of the data streams. Accordingly, in real-time, information corresponding to data objects of data streams from multiple streaming devices can be updated, analyzed based on the update, and further used in analysis of other data streams.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
computing a set of hashes of each of a plurality of real-valued vectors, each of the real-valued vectors corresponding to a sample data object of sample data objects of a data stream, the data stream originating from a plurality of streaming devices, each of which transmit sample data objects over a network independent of the other streaming devices, each sample data object being individually identifiable, and the data stream including different data types, wherein the set of hashes are computed by determining a plurality of keys for the real-valued vector of each sample data object and using partitioning to select a top set of the keys as the hashes;
for each respective sample data object,
prior to receiving a respective sample data object, receiving data objects at a database and computing a set of hashes of real-valued vectors corresponding to each of the data objects;
identifying data objects corresponding to the respective sample data object from the received data objects, the corresponding data objects identified based on determining an amount of overlap between a set of hashes corresponding to the respective sample data object and each set of hashes corresponding to each data object;
generating a list of the corresponding data, the list of the corresponding data objects ordered based on the amount of overlap between each set of hashes of each of the corresponding data objects to set of hashes of the respective sample data object; and
updating data structure corresponding to the respective data object, the data structure representative of sample data object-related activity based on the list of corresponding data objects, each corresponding data structure to provide data stream analytics in response to receiving each respective sample data object.

2. The method as defined in claim 1, further comprising: processing each sample data object to compute the real-valued vector based on a type of data streaming device that provided each sample data object, the data stream being received from the data streaming device.

3. The method as defined in claim 1, further comprising: receiving the plurality of real-valued vectors from the plurality of data streaming devices, each of the data streaming devices having processed a respective sample data object to compute the corresponding real-valued vector.

4. The method as defined in claim 1, wherein each of the plurality of sets of hashes is computed using an orthogonal transform based indexing of the corresponding real-valued vectors.

5. The method as defined in claim 1, further comprising: updating an index comprising the sets of hashes of data objects and object identifiers of each the corresponding data objects in the database.

6. The method as defined in claim 1, further comprising: querying the database based on the set of hashes calculated to generate the list of corresponding data objects.

7. The method as defined in claim 1, wherein the data objects are identifiable in the database using an index of corresponding hashes of real-valued vectors of the data objects and object identifiers of the data objects.

8. The method as defined in claim 1, further comprising providing a visual presentation of the data structure for presentation on a display device.

9. The method of claim 1, wherein the corresponding data structure comprises a cluster list data structure identifying unique data objects in the data stream.

10. The method of claim 7, further comprising reidentifying each of the data objects, identifying corresponding hub data objects, and performing hubness reduction for the data stream.

11. An apparatus for use in data stream analytics, the apparatus comprising:
a hash generator to generate a plurality of sets of hashes, each set of hashes generated for a sample data object of sample data objects of a data stream, the data stream originating from a plurality of streaming, each of which transmit sample data objects over a network independent of the other streaming devices, and the data stream including different data types, each of the set of hashes generated based on a real-valued vector of a corresponding sample data object, wherein the hash generator generates the sets of hashes by determining a plurality of keys for the real-valued vector of the corresponding sample data object and using partitioning to select a top set of the keys as the hashes;
an indexer to index each set of hashes with an object identifier of the corresponding sample data object in an index of a database;
a list generator to generate, for each sample data object, a list of previously received data objects from the index based on the sets of hashes, the index comprising sets of hashes of real-valued vectors corresponding to the previously received data objects and object identifiers of the previously received data objects, the list generator identifying data objects in the index having a set of hashes that share the most number of hashes generated by the hash generator; and
a stream analytics manager to update, for each sample data object, a data structure, corresponding to a respective sample data object, based on the list of previously received data objects, for the respective sample data object, and to apply machine learning to the data structure to provide real-time data stream analytics based on the respective sample data object.

12. The apparatus of claim 11, wherein the stream analytics manager further updates the data structure based on the applied machine learning.

13. The apparatus of claim 11, wherein the hash generator receives the real-valued vector of the corresponding sample data object from a streaming device, the streaming device having preprocessed the corresponding sample data object to determine the real-valued vector.

14. The apparatus of claim 11, wherein the stream analytics manager provides the data structure to a graphical user interface for presentation of the data structure.

15. A non-transitory machine readable storage medium comprising instructions that, when executed, cause a machine to at least:
receive real-valued vectors, each corresponding to a data object of data objects of data streams, the data streams originating from a plurality of streaming devices, each of which transmit sample data objects over a network independent of the other streaming devices, and the data streams including different data types; and
provide real-time stream analytics corresponding to the data objects of the data streams by:
for each newly received real-valued vector,
generate a set of hashes based on the newly received real-valued vector, wherein the set of hashes are generated by determining a plurality of keys for the newly received real-valued vector and using partitioning to select a top set of the keys as the hashes;
index the set of hashes in an index of a database with an object identifier corresponding to a data object of the newly received real-valued vector;
generate a list of nearest neighbor data objects based an amount of overlap between the set of hashes of the newly received real-valued vector and each of sets of hashes corresponding to previously received real-valued vectors for corresponding data objects; and
update data structure, corresponding to the data object of the newly received real-valued vector, the corresponding data structure to provide real-time stream analytics associated with the data object of the newly received real-valued vector.

16. The non-transitory machine readable storage medium of claim 15, wherein the instructions, when executed, further cause the machine to:
use the real-time stream analytics to further update the corresponding data structure.

17. The non-transitory machine readable storage medium of claim 15, wherein the instructions, when executed, further cause the machine to:
generate the list of nearest neighbor data objects by querying the index to identify objects identifiers comprising the same hashes as the hashes generated based on the newly received real-valued vector.

18. The non-transitory machine readable storage medium of claim 15, wherein the instructions, when executed, further cause the machine to:
provide a visual representation of the corresponding data structure on a graphical user interface of a display device.

* * * * *